June 23, 1970 N. M. RASKHODOFF 3,517,274

BUS BAR ASSEMBLY WITH CIRCUIT BREAKERS

Filed Jan. 25, 1968 3 Sheets-Sheet 1

INVENTOR
NICHOLAS M. RASKHODOFF

June 23, 1970 N. M. RASKHODOFF 3,517,274

BUS BAR ASSEMBLY WITH CIRCUIT BREAKERS

Filed Jan. 25, 1968 3 Sheets-Sheet 2

INVENTOR
NICHOLAS M. RASKHODOFF

BY R. J. Erickson
R. A. Sciascia
ATTORNEYS

June 23, 1970 N. M. RASKHODOFF 3,517,274

BUS BAR ASSEMBLY WITH CIRCUIT BREAKERS

Filed Jan. 25, 1968 3 Sheets-Sheet 3

INVENTOR

NICHOLAS M. RASKHODOFF

BY [signature]

ATTORNEYS

United States Patent Office 3,517,274
Patented June 23, 1970

3,517,274

BUS BAR ASSEMBLY WITH CIRCUIT BREAKERS

Nicholas M. Raskhodoff, Cheverly, Md., assignor to the United States of America as represented by the Secretary of the Navy Filed Jan. 25, 1968, Ser. No. 700,555
Int. Cl. H02b 1/04
U.S. Cl. 317—112 2 Claims

ABSTRACT OF THE DISCLOSURE

A bus bar assembly has one or more circuit breakers incorporated therewith to protect all circuits powered by the bus bars. The circuit breakers are mechanically and electrically connected between the bus bars and a power outlet receptacle by means of a printed circuit type of interconnection board.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to a system for the distribution of electric power and more particularly to a bus bar assembly which incorporates a printed circuit type interconnection board for electrically and mechanically coupling a multipin electrical connector to a bus bar assembly through a set of circuit breakers so that each circuit extending from the multipin connector is protected against excessive current flow. This invention relates to a compact electromechanical assembly for interwiring one or more circuit breakers between a bus bar assembly and a multipin electrical power outlet receptacle.

In the past, power distribution to cabinet assemblies for electronic modules would generally be accomplished by means of terminal blocks and individual insulated conductors connected between those terminal blocks which were mounted on the cabinet assembly. This type of power distribution involved a great deal of additional wiring and consumed a large amount of valuable space. In those cases where bus bar assemblies were employed for power distribution, many of these assemblies did not lend themselves to electrical connection with multipin connectors while none of them included a compact electromechanical assembly for connection of circuit breakers thereto for protecting the circuits and components powered by the bus bar assembly. In those instances where circuit breakers were included in the individual circuits, sections of the circuits often remained unprotected.

SUMMARY OF THE INVENTION

The general purpose of present invention is to provide an improved electrical power distribution system by providing a compact electromechanical assembly for interconnecting a plurality of circuit breakers with a bus bar assembly and a multipin electrical output power receptacle. To achieve this result, the present invention contemplates a printed circuit type interconnection board which has contact pins mounted thereon to be seated within corresponding apertures formed in the bus bars and further includes a series of solder cups mounted thereon to receive the contact pins of the circuit breakers and also includes electrically conductive strips formed on said board to interconnect the bus bars to an electrical output power receptacle through the circuit breakers. The device is constructed in such a manner as to provide positive electrical connections between all contacts, to leave no unprotected portions of any electrical circuits, and to enable quick dismantling and reassembly for replacement of any parts therein. The device is designed so that the solder cups and recesses formed in the bus bars may be pre-soldered to form miniature solder pots for the respective connector pins to be inserted therein so that, when the components of this assembly are assembled, the entire assembly may be placed in an oven whose temperature is then raised above the melting point of the solder, thus electrically connecting all contacts by a single soldering process. The resulting connections therefore are mechanically sound and provide good electrical continuity.

An object of the present invention is to provide a new and improved electrical power distribution system.

Another object of this invention is to provide an electrical power distribution system having means for protecting the electrical components and circuits connected thereto against excessive voltages and currents.

A further object to this invention is to provide a device for interconnecting circuit protecting means to a bus bar assembly which provides good electrical and mechanical connections between these components.

Another object is to provide a device for interconnecting circuit breakers to a bus bar assembly in such a manner that the assembly is compact and may be readily disassembled and reassembled to facilitate replacement of parts.

Other objects and many of the attendant advantages of this invention will be readily appreciated as the same becomes better understood by reference to the following detailed description when considered in connection with the accompanying drawing wherein:

DESCRIPTION OF THE PREFERRED EMBODIMENT

Figure 1:
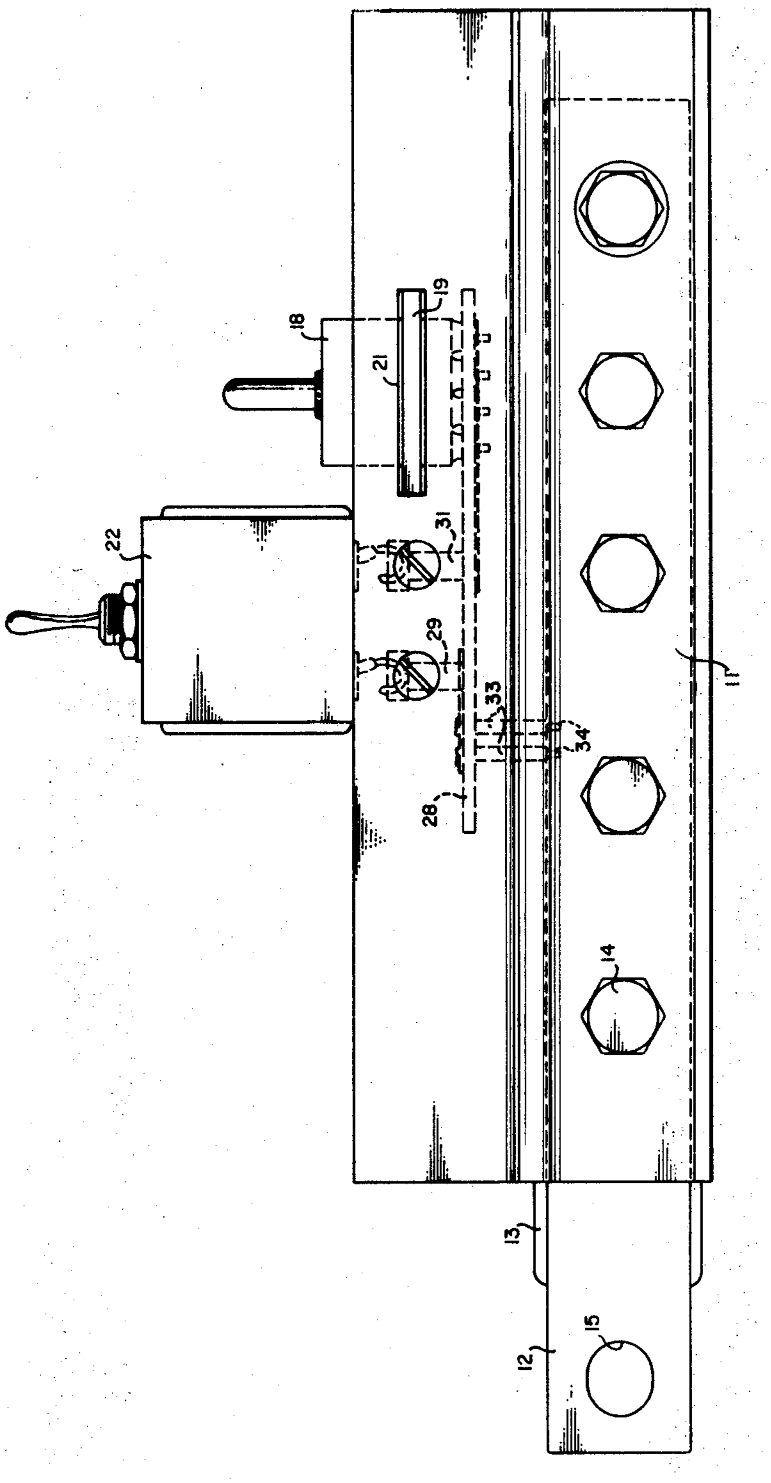
FIG. 1 is a side view of a bus bar assembly constructed in accordance with a preferred embodiment of this invention.
Figure 2:
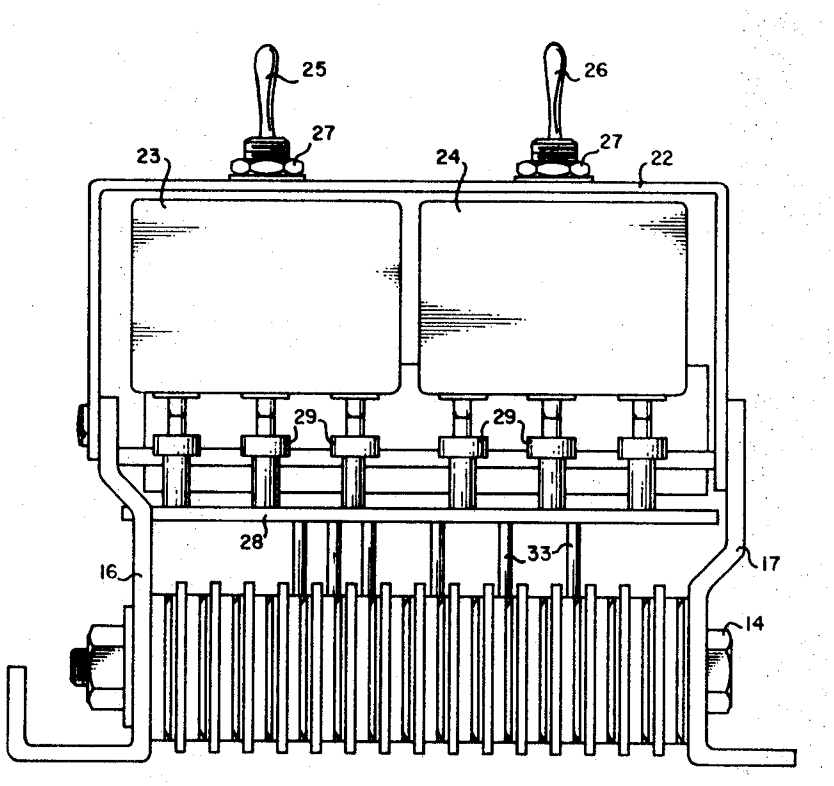
FIG. 2 is an end view of the assembly shown in FIG. 1.
Figure 3:
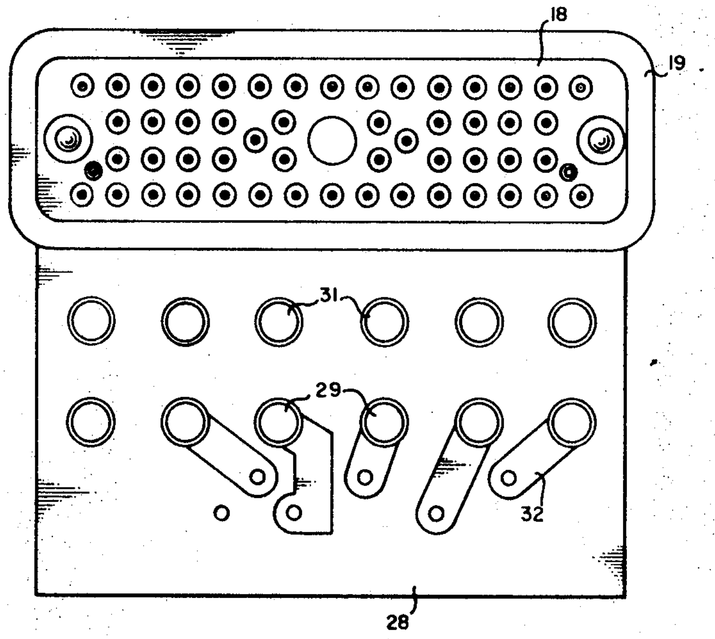
FIG. 3 is a top view of the interconnection board shown in FIGS. 1 and 2.
Figure 4:
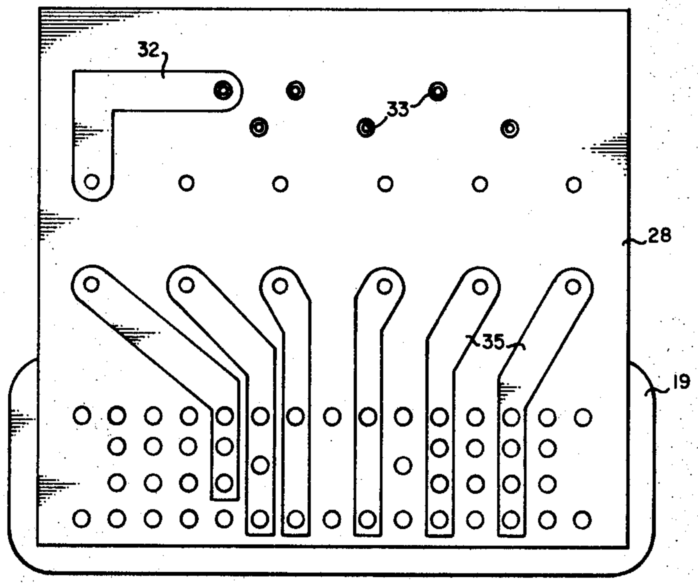
FIG. 4 is a bottom view of the interconnection board shown in FIG. 3.

The bus bar assembly is shown as having a plurality of parallel bus bars 11 which are made of electrically conductive material having a flat rectangular cross section. Each end of the bus bars have a cutaway portion 12 of reduced thickness to permit a shiplap assembly with other bus bars in adjacent bus bar assembly. The cutaway portion is formed on one side of one end of the bus bar while the cutaway portion of the other end of the bus bar is formed on the opposite side thereof, so that the bus bars may be assembled together in an end to end relationship to form a junction having the same thickness as the major portion of the bus bars. Insulating strips 13, of glass fiber construction bonded with silicone resin or any other suitable electrical insulating material, are interposed between each of the bus bars to provide spacing and electrical insulation between each pair of adjacent bus bars. The insulating strips should be capable of electrically isolating the bus bars at the highest voltage for which the assembly is intended and should also be capable of withstanding high temperatures of the soldering process hereinafter described. The bus bars 11 and the insulating strips 13 may be held together in a stacked assembly by means of a plurality of bolts 14 which extend through aligned apertures 15 formed in the bus bars and the insulating strips. To electrically insulate the bolts 14 from the bus bars, tubular inserts of dielectric material may be positioned concentrically around the bolts 14 within the aligned apertures 15. To mechanically couple one bus bar assembly to another bus bar assembly, the assemblies may be placed end to end at the shiplap portions and mechanically coupled together by a similar bolt electrically isolated by dielectric material positioned concentrically around the bolt and extending through aligned aperture formed in the reduced thickness portions 12 of the bus bars. Each bus bar assembly is then mounted between a pair of support brackets 16 and 17 which have apertures formed therein for alignment with the apertures in the bus bar assembly for suitable connection thereto by means of the bolts 14. Support brackets 16 and 17 provide appropriate means for mounting the bus bar assembly upon or onto the instrument cabinet and further serve to support the novel interwiring means employed to connect the bus bar assembly to the electrical components which are to receive their power from the bus bars.

A multipin electrical connector receptacle 18 is mounted upon the support brackets 16 and 17 in such a manner as to be rigidly suspended above the bus bar assembly. The plug portion of the electrical connector which cooperates with the receptacle 18 is not shown. The connector receptacle 18 has an external flange 19 formed thereon which is so dimensioned that the portions of the flange on the end surfaces of the connector receptacle extend into slots 21 formed in the side walls of the support brackets. When the connector receptacle is positioned above the bus bar assembly with the support brackets bolted to the stacked bus bars, the boundary of the slots 21 engage the flange 19 in such a manner as to restrain the connector from lateral and/or vertical movement.

Also mounted on the support brackets 16 and 17 is a bridge member 22 from which is suspended a pair of plural element circuit breakers 23 and 24. The circuit breakers may be reset by means of the toggle handles 25 and 26 which extend through openings formed in the bridge member 22 and are anchored thereto by means of retaining nuts 27. The multipin output power receptacle 18 and the circuit breakers are connected to the stack of bus bars by means of a novel interconnection board 28 which is made of a dielectric material and has a plurality of electrically conductive strips formed thereon like a printed circuit board. Since the particular circuit breakers shown in the drawing are capable of handling a total of six circuits, the interconnection board is provided with a row of six solder cups 29 for engagement with the input pins or terminals of the circuit breakers and is also provided with a second row of six solder cups 31 for electrical contact with the output terminals of the circuit breakers. The solder cups are mounted on the upper surface of the interconnection board having their open ends facing upwardly to receive the contact terminals of the circuit breakers. The six input solder cups are connected to six individual electrically conductive strips 32 mounted upon the upper surface of the interconnection board, each of said strips being mechanically and electrically connected to corresponding connection posts 33 which are mounted upon the bottom surface of the interconnection board and are connected to the conductive strips 32 by means of rivets or other suitable fastening means. The connection posts 33 are spaced along the interconnection board in such a manner as to be received within shallow recesses 34 formed in the upper edge portions of the bus bars 11. The interconnection board is further provided with a second set of six electrically conductive strips 35 which are secured to the lower or bottom surface of the interconnection board and are electrically connected to the second set of solder cups 31 which receive the output terminals of the circuit breakers. The interconnection board has a plurality of apertures formed therein and being so arranged as to receive the terminals of the power output receptacle 18 so that the contacts may extend through said apertures for engagement with the conductive strips 35. The remaining bus bars which are not connected to the power output receptacle through the interconnection board and circuit breakers may be connected directly to the pins of the power output receptacle by connection posts, not shown, similar to posts 33.

For the purpose of the insuring of a good electrical connection between the various elements, each of the shallow recesses 34, which are formed in the upper edges of the bus bars, are pre-soldered to form miniature solder pots for the individual connector posts 33 and each of the solder cups 29 and 31 are likewise pre-soldered to form solder pots for the terminals of the circuit breakers. The interconnection board is then positioned above the bus bar assembly so that the posts 33 extend partially into the recesses 34 and so that the terminals of the circuit breakers are partially received within the solder cups 29 and 31. The entire bus bar assembly together with the circuit breakers, interconnection board and power output plug is then placed in an oven whose temperature is elevated above the melting point of the solder pots and the interconnection board is then urged toward bus bars so that each post 33 enters into its respective recess and similarly the circuit breaker terminals are urged into soldered cups. The entire assembly is then cooled so that the interconnection board is secured to the bus bars assembly and the circuit breaker terminals are secured to the interconnection board by means of solder cups. It may thus be seen that electrical power for various components is obtained from the bus bars 11 through the conductive post 33, along the conductive strips on the interconnection board to the solder cups and thus to the input terminals of the circuit breakers. The power then flows through the circuit breakers, through the output terminals of the circuit breakers to the solder cups 31, along the conductive strips 35 and then to the output power receptacle which may be a multipin electrical connector as shown. It is therefore apparent that all electrical components which obtain their power from the output power receptacle are protected by the circuit breakers 23 and 24. This device not only provides protection for each and every component which obtains power from the bus bar assembly but also protects wiring harness which extends from the power output receptacle 18 to the various components. By this arrangement, the circuit breakers protect all circuits and components, except that portion of the circuit between the bus bar and the circuit breakers themselves, which consists solely of the post 33 and the conductive strips 32 on the interconnection board, but these elements may be easily designed to handle any power available at the bus bars. It may also be noted that this device is constructed as to permit disassembly and reassembly of the circuit breakers for replacement of the circuit breakers should one malfunction during operation. The structure of the interconnection board is such as to permit ease of assembly with the bus bars and the other components and yet will produce rigid mechanical connections and assure good electrical connections at the various contact points.

Obviously many modifications and variations of the present invention are possible in light of the above teachings. It should be realized that the device may be modified to include other types and quantities of circuit breakers other than that specifically shown and described and that the interconnection board may be modified to include more or fewer contact posts 34 and conductive strips and solder cups to accommodate the particular circuit breakers and power output receptacles employed in any desired system and that the position of the contact posts 33 and conductive strips may be so changed as to selectively engage predetermined bus bars 11. It is therefore to be understood the invention may be practiced otherwise than as specifically described.

What is claimed and desired to be secured by Letters Patent of the United States is:

1. A bus bar assembly comprising:

a plurality of parallel electrically conductive bus bars spaced apart by dielectric strips, a plurality of circuit breakers each having input and output terminals, a multi-pin electrical connector receptacle, support means supporting said circuit breakers and said receptacle across the bus bars and spaced therefrom, interconnection means including an interconnection board of dielectric material having first and second sets of electrically conductive strips formed thereon, said interconnection board being supported across and spaced from said bus bars by said support means, and said interconnection means further includes means for electrically connecting the circuit breaker input terminals to said bus bars through said first set of conductive strips and for electrically connecting said circuit breaker output terminals to said receptacle through said second set of conductive strips.

2. The device of claim 1 wherein:

said bus bars have recesses formed in one surface thereof, said interconnection means includes a plurality of electrically conductive posts and a plurality of solder cups, said posts having one end thereof partially received within said recesses and the other end thereof connected to said first set of conductive strips, and said solder cups each being electrically connected respectively to one of said conductive strips and having an open end therein electrically coupled to one of the circuit breaker terminals.

References Cited

UNITED STATES PATENTS

| | | | |
|---|---|---|---|
| 2,603,546 | 7/1952 | Lais | 317—120 X |
| 3,142,784 | 7/1964 | Bloomfield | 317—113 |
| 3,328,647 | 6/1967 | Gryctko | 317—119 |
| 3,354,357 | 11/1967 | Jorgensen et al. | 317—120 X |

LARAMIE E. ASKIN, Primary Examiner

G. P. TULIN, Assistant Examiner

U.S. Cl. X.R.

317—119